United States Patent [19]
Philipp

[11] 3,933,458
[45] Jan. 20, 1976

[54] METHOD OF MAKING A RIGID UNITARY FERTILIZER COMPOSITE

[76] Inventor: Warren H. Philipp, 6234 Columbia Road, North Olmsted, Ohio 44070

[22] Filed: Dec. 5, 1974

[21] Appl. No.: 529,740

Related U.S. Application Data

[63] Continuation-in-part of Ser. No. 412,272, Nov. 2, 1973, abandoned.

[52] U.S. Cl. .................. 71/27; 71/11; 71/64 A; 71/64 F
[51] Int. Cl.² ............... C05G 1/00; C05C 13/00
[58] Field of Search .......... 71/27, 28, 29, 30, 64 A, 71/64 R, 64 E, 64 F, 11

[56] References Cited
UNITED STATES PATENTS
3,057,713 10/1962 Gessler .................. 71/64

FOREIGN PATENTS OR APPLICATIONS
192,405 2/1967 U.S.S.R. .................. 71/27

OTHER PUBLICATIONS
The Condensed Chemical Dictionary, Van Nostrand Reinhold, 8th Ed., pp. 53–55.

*Primary Examiner*—Frank A. Spear, Jr.
*Assistant Examiner*—Ferris H. Lander
*Attorney, Agent, or Firm*—McNenny, Farrington, Pearne & Gordon

[57] ABSTRACT

This invention presents a method of making a rigid unitary fertilizer composite for fertilizing plants and trees and articles produced by the method. In the form of a spike, the composite has sufficient strength and toughness so as to enable it to be pushed or pounded into the ground near the roots of plants and trees. The method involves making an aqueous paste containing plant nutrients, acrylamide, and a catalyst for the polymerization of the acrylamide. The paste is then molded to the desired shape. The acrylamide is allowed to polymerize, after which time the excess water is removed by drying. The final product, which should contain at least 5 weight percent polyacrylamide, is a rigid mass.

11 Claims, No Drawings

METHOD OF MAKING A RIGID UNITARY FERTILIZER COMPOSITE

This application is a continuation-in-part of my copending application Ser. No. 412,272, filed Nov. 2, 1973, and now abandoned.

This invention relates to a simple method of making rigid unitary fertilizer composites such as fertilizer spikes which have sufficient strength and toughness so as to enable them to be pushed or pounded directly into the ground near the roots of plants and trees, thereby providing them with the necessary nutrients. Such rigid composites are made by molding an aqueous slurry or paste containing powdered or granulated plant nutrients, acrylamide ($CH_2{:}CHCONH_2$), and a quantity of a suitable catalyst such as a peroxydisulfate of ammonium or potassium to cause polymerization of the acrylamide. Polymerization of the acrylamide is allowed to occur, thereby binding the plant nutrients in a polyacrylamide matrix. After polymerization of the acrylamide has taken place, the molded composite shape is dried to remove excess water. The result is a hard, tough, rigid unitary mass. The quantity of acrylamide used to make the paste or slurry should be such as to provide at least 5 weight percent of polyacrylamide in the final product.

The advantages of using rigid fertilizer composites in the form of spikes for supplying nutrients to plants by pounding or inserting them into the ground near the roots of plants and trees over other fertilizing methods is recognized by those familiar with the art. In view of this, several patents have been issued concerning methods for the preparation of rigid fertilizer composites in stick or spike form for supplying nutrients to plants and trees.

The fertilizing stick of L. C. Antrim (U.S. Pat. No. 2,032,608) is formed by pressing a mixture containing water, fertilizer, a cellular fibrous material and a binder. The resulting gluey mass is then dried. The binding agents cited include gum arabic, agar, dextrine, starch, and flour. In general, the nutrient concentration of this composite is quite low.

The fertilizing block of A. H. Martin (U.S. Pat. No. 2,531,360) is made by compressing a mixture of plant nutrients with the binding agent, cyanamide, to a pressure of about 15,000 lbs. per square inch. This method, however, requires the use of high pressure equipment, and therefore offers a disadvantage in terms of economy for the mass production of large numbers of fertilizer composites such as spikes.

The fertilizing sticks described by A. E. Gessler (U.S. Pat. No. 3,057,713) are formed by drying an aqueous molded dough consisting essentially of a powdered super-phosphate, but also containing other plant nutrients, phosphoric acid and asbestos fiber. The hardening mechanism involves a reaction between the fibrous magnesium silicate in the asbestos and the phosphoric acid to form a hard, fibrous binder for the mass. Fertilizer composites of this type are limited to those of high phosphate content at the expense of high nitrogen and potash concentrations.

Other binders used in fertilizer composites presented in the patent literature are polyvinyl alcohol resin derived from a partial hydrolysis of polyvinyl acetate, P. L. Boatwright (U.S. Pat. No. 3,232,007), and commercial wheat paste, R. D. Parry (U.S. Pat. No. 3,290,821).

A recent innovation in the art of fertilizer composites is the method of making a slow release fertilizer given by R. U. Schenk (U.S. Pat. No. 3,502,458). This method involves the making of a rigid fertilizer mass such as a spike by the application of pressure and heat to an essentially dry mixture of fibrous organic material, fertilizing material and a bonding agent. Binders used for this purpose include Cumar V-3, urea-formaldehyde, phenolformaldehyde, Vinsol, and Eastobond M-2. A disadvantage of this process is that high pressure equipment is required which in some cases must be able to withstand temperatures up to 380° F.

In U.S.S.R. Author's Certificate No. 192405, there is disclosed the use of acrylamide as a base for nutrient salts. According to that certificate, the resulting product is a uniform, viscous, sticky polymer mass, rather than a rigid composite which may be pushed or pounded directly into the ground. Since the polymer mass has water as its main ingredient (about 77 percent by weight, corresponding to a water volume percent of 84), any attempts to dry the polymer mass would merely result in a powdery product which would not be capable of retaining a predetermined shape, if in fact any shape resulted after the drying operations. Furthermore, the process is based on the saponification of acrylonitrile with sulfuric acid, followed by neutralization. Because of the relatively large amount of sulfuric acid used, the product must contain large amounts of sulfates. For composites of high primary plant nutrient value (nitrogen, phosphate, potassium), sulfate salts are undesirable. Also, sulfates leave an acid residue in the soil which may not be desirable in some cases.

My invention involves rigid, unitary fertilizer composites and a method of making those composites, whereby powdered or granulated plant nutrients, soil conditioners, plant hormones and insecticides are bonded together in a polyacrylamide matrix. The invention does not reside, therefore, in a particular fertilizer formulation, insecticide, or plant hormone, since such compositions and formulations are well known in the art. The invention is, rather, in the particular vehicle or matrix within which those compositions and formulations are suspended. It should be understood that the phrase "plant and soil conditioner" as used in the claims embraces fertilizers, insecticides, and plant hormones. In contrast to the many processes used to make rigid fertilizer composites, my method does not necessitate the use of high pressure to bond the ingredients into a rigid form, nor does my method provide composites having deleterious binders or binders which merely provide bulk and thereby reduce the concentration of nutrients in the composite. At the same time, the fertilizer composite in spike form made by the method of my invention has good mechanical strength and sufficient toughness so that the spike may be driven into the ground near the roots of plants and trees without fracturing of the spike as a result of brittleness. Such a composite may be made to contain quick release plant nutrients which are often required by plants and trees in the spring when their growth activity is beginning. For the remainder of the growing season, slow release, organically bonded nitrogen from the polyacrylamide binder is available to the plant or tree. Because the rigid composites produced by my method may contain a minimum of inert ingredients, a composite may be formulated to comprise a high concentration of plant nutrients.

As was previously indicated, production of composites by my method requires simple equipment, and does not necessitate the use of high pressure and/or high temperature processes. In view of this advantage, my method lends itself well to inexpensive production of large numbers of unit rigid composites and is especially adaptable for the mass production of small fertilizer spikes which may be used to fertilize small bushes and houseplants.

The general method of my invention for the production of rigid fertilizer composites is as follows. An aqueous paste or slurry is made which contains granulated or powdered plant nutrients, acrylamide, ($CH_2$:$CHCONH_2$) and the necessary amount of an appropriate catalyst to cause the acrylamide to polymerize to polyacrylamide. The amount of acrylamide used in the paste or slurry should be such as to insure a polyacrylamide content of at least about 5 weight percent in the final composite, and preferably between about 10 and 30 weight percent. The paste or slurry is then molded into the desired shape such as a spike. The molded mixture is allowed to stiffen due to the polymerization of the acrylamide. The polymerization of the acrylamide may be hastened by heating the mixture to about 70° C. After polymerization of the acrylamide in the molded mixture has taken place, the molded composite has, in general, rubberlike mechanical properties. The molded composite is then dried in dry air at room temperature or, more conveniently, in an oven at about 100° C. The dried final product is rigid, which, in the form of a spike, may be driven into the ground without fracture. This method may be used to make a variety of shapes such as blocks, sticks, spikes, or cylinders, etc.

It is not necessary that the polymerization of the acrylamide in the aqueous mixture be accomplished at elevated temperatures. Using ammonium peroxydisulfate as the catalyst, the polymerization at 70° C. is completed within several minutes, whereas, in the same mixture, the polymerization at room temperature requires several hours for completion.

There are many catalysts which may be used to promote the polymerization of acrylamide. Even ionizing radiation (e.g., X-rays, electron beams, and gamma radiation) will promote the polymerization of acrylamide in an aqueous slurry. The most convenient catalysts for this polymerization, however, are ammonium peroxydisulfate and potassium peroxydisulfate.

Within the spirit of my invention is the incorporation, in addition to plant nutrients, of plant hormones, insecticides, fungicides and soil conditioners into the aqueous paste or slurry to be molded.

A convenient procedure for making the aqueous paste or slurry which is to be molded is to first make up a concentrated aqueous solution of acrylamide, the solution comprising at least 50 weight percent of acrylamide, containing about 0.1 weight percent of either ammonium peroxydisulfate or potassium peroxydisulfate as a catalyst. This solution is then added with stirring to the dry powdered or granulated plant nutrients in such an amount as to form a paste or slurry, having water present in an amount between about 5 and 40 percent by volume. The amount of solution added, however, must be of sufficient quantity so as to insure at least five weight percent of polyacrylamide in the final dried composite. In order to prevent premature polymerization of the acrylamide in solution, the catalyst should be added just prior to addition of the solution to the dry plant nutrients. I found that each 100 grams of powdered plant nutrients required from 25 to 40 milliliters of the concentrated acrylamide solutions to make a moldable paste or slurry. In general, the greater the amount of acrylamide present in the molded mixture, the harder and tougher will be the final composite.

The following specific examples on a laboratory scale are presented to illustrate my method for the preparation of fertilizer spikes.

EXAMPLE I

To 1,000 grams of a powdered dry mixture containing the following ingredients of fine enough particle size to pass through a 60-mesh sieve,

| | |
|---|---|
| Ammonium dihydrogen phosphate ($NH_4H_2PO_4$) | -60% by weight |
| Potassium Nitrate ($KNO_3$) | -40% by weight | is added 350 milliliters of an aqueous solution containing 55% by weight of acrylamide ($CH_2$:$CHCONH_2$) and 0.1% by weight of potassium peroxydisulfate ($K_2S_2O_8$). The mixture is stirred to form a paste and has a water content of 18% by volume. The paste is molded into spikes and then heated to about 70° C. whereupon the acrylamide in the mixture polymerizes. This requires several minutes at 70° C. At this point, the molded spikes have a rubberlike consistency. The molded spikes are now dried at 110° C. for about five hours in an oven and allowed to cool to room temperature. The fertilizer spikes thus produced are hard and tough enough to be pushed into the ground.

EXAMPLE II

This example involves the preparation of fertilizer spikes for acid-loving plants, such as rhododendrons and evergreens. The spikes are made as follows.

Three hundred milliliters of an aqueous solution containing 50% by weight of acrylamide and 0.1% by weight of ammonium peroxydisulfate (($NH_4$)$_2S_2O_8$) is added to 1000 grams of dry powdered plant nutrients of the following composition:

| | |
|---|---|
| Ammonium dihydrogen phosphate ($NH_4H_2PO_4$) | -60% by weight |
| Potassium dihydrogen phosphate ($KH_2PO_4$) | -40% by weight |

The mixture is stirred to form a paste having a water content of 18.7% by volume, which is molded into spikes. These molded spikes are allowed to remain at room temperature for about 12 hours, during which time polymerization of the acrylamide occurs. After the polymerization is complete, the rubberlike spikes are dried for several days in dry air at room temperature, after which time they become tough and hard.

EXAMPLE III

A slurry was made by thoroughly mixing 59.5 grams of ammonium dihydrogen phosphate, 25.5 grams of potassium nitrate, and 15.0 grams of acrylamide with 5 milliliters of water (about 8 volume percent water). A sufficient amount of a polymerization catalyst (peroxydisulfate of either ammonium or potassium) is dissolved in the measured volume of water prior to adding the water to the dry mixture. The slurry was a powdery, non-free-flowing slurry which had to be tamped into the mold. After the slurry was tamped into the mold, the mold was heated to about 70° C. to cause the acrylamide to polymerize. Upon cooling to room temperature, the composite was removed from the mold and dried at about 110° C. for about 12 hours. The dried, rigid composite was cooled to room temperature and examined, and was found to be hard and nonporous.

EXAMPLE IV

A composite was molded by employing the identical steps and ingredients set forth in Example III, except that 7.5 milliliters of water (about 11 volume percent water) was employed in mixing the slurry. The slurry was non-free-flowing and had to be tamped into the mold, and the finished, dried composite was hard and nonporous.

EXAMPLE V

A composite was molded by employing the identical steps and ingredients set forth in Examples III and IV, except that 10 milliliters of water (about 14 volume percent water) was employed in making the slurry. The slurry was a non-free-flowing, dough-like paste which had to be tamped into the mold. The finished dried composite was hard and nonporous.

EXAMPLE VI

A composite was molded by employing the steps and ingredients set forth in Examples III through V, except that 18 milliliters of water (about 23 volume percent water) was employed. A free-flowing slurry was formed which could be poured into the mold. The slurry settled into the mold without tamping, and the finished dried composite was hard but slightly porous. The product was not quite as strong as that made from slurries of lower water content, but nevertheless was strong enough in spike form to allow pounding into the ground without fracture.

EXAMPLE VII

A composite was formed by employing the identical steps and ingredients set forth in Examples III through VI, except that 40 milliliters of water (about 40 volume percent water) was employed. The slurry was a free-flowing, watery slurry that was readily pourable into the mold. The polymerized slurry, after removal from the mold, was easily deformed because of its fluidity. The composite had some tendency to lose its molded shape during the drying operation and after drying was quite porous and easily fractured. However, the composite could be driven into soft earth and would be suitable for houseplants and soft earth planting beds.

EXAMPLE VIII

The eighth example is given to demonstrate the making of rigid, unitary fertilizer composites of high nitrogen content, and demonstrates the use of ammonium nitrate in the slurry mix. Because ammonium nitrate is very soluble in water, it is advantageous, but not absolutely necessary, to use a slurry containing a low volume percent of water. To the following mixture:
  30 grams of potassium dihydrogen phosphate (powder),
  55 grams of ammonium nitrate (granular), and
  15 grams of acrylamide,
was added 5 milliliters of water (about 7.7 volume percent water) which contained the peroxydisulfate catalyst. The mixture was thoroughly triturated in a mortar with a pestle until a uniform paste was obtained. The paste was tamped into a mold, then heated to about 70°C. to cause polymerization of the acrylamide. When cooled to room temperature, the molded composite was removed from the mold and dried in an oven at 100°C. for about 24 hours. Although the composite was flexible or rubbery at 100°C., when cooled to room temperature it became hard. The finished dried product was tough and nonporous. The finished product was hydroscopic (because of the ammonium nitrate) and thus should be stored in the absence of moisture.

EXAMPLE IX

The ninth example is given to demonstrate the use of a water-soluble organic liquid, ethanol, added to the slurry mix to improve moldability of the slurry containing a low volume percent of water.

A composite was formed by employing the identical steps and ingredients set forth in Example VIII, except that a solution comprising 3 milliliters of water and 1 milliliter of ethanol (about 4.8 volume percent water) was employed instead of the 5 milliliters of water used in the previous Example VIII.

The finished product was tough and nonporous.

The lack of porosity in the final composite is beneficial in terms of hardness and resistance to fracture. This property is important for long fertilizer spikes which must be pounded deep into the ground. For smaller spikes, 6 inches or less in length, which are intended to be used for houseplants, rosebushes, etc., high strength is not necessary. Thus, great porosity may be tolerated. After the spike is in the ground, lack of porosity is not a factor because the soluble fertilizer ingredients are readily leached out by ground water as the solid water-soluble polymer (polyacrylamide) swells and disintegrates.

For all uses and sizes of the fertilizer composites, one should compromise in favor of the strength of the final product rather than the pourability of the slurry into the mold. In practice, then, the ideal water content range is toward the low end, or between about 10 and 20 volume percent water. When a higher water-soluble, finely powdered ingredient, such as ammonium nitrate, is used, very little water is needed to make a good slurry. On the other hand, when a less soluble ingredient is incorporated into the mix, a somewhat higher water content is required to make the slurry to be molded.

My method is not restricted to those plant nutrient compositions given in the examples. Any suitable plant nutrient formulation may be incorporated into the product. Also, the preparation of the aqueous paste or slurry to be molded is not limited to the method illustrated in the previous examples; any suitable method may be employed so long as the paste or slurry to be molded contains acrylamide. In addition to acrylamide, the aqueous paste or slurry to be molded may contain ingredients to improve moldability of the slurry or paste and also to improve the physical properties of the final composite product. These additions may include fillers, plasticizers, surface active agents, and organic liquids.

To increase the toughness of the fertilizer composite, the aqueous paste to be molded may contain, in addition to plant nutrients, acrylamide and a suitable polymerization catalyst, water-soluble monomers other than acrylamide whose molecular structure has one or more carbon-to-carbon double bonds, said organic monomers being capable of addition polymerization in the aqueous paste or slurry. These organic monomers would include acrylic acid ($CH_2{:}CHCO_2H$), acrylonitrile ($CH_2{:}CHCN$) and the water-soluble esters of acrylic acid. The quantity of organic monomers, including the acrylamide, present in the aqueous paste or slurry should be such as to provide at least 5 percent by weight of organic polymeric material in the final composite product.

For fertilizer composites made in the shape of a spike, the pointed end, as well as the opposite end, which may be subjected to pounding action of a mallet, should be harder and tougher than the rest of the spike. This may be accomplished by increasing the acrylamide content in the paste or slurry used to mold these ends. In fact, the aqueous slurry or paste to be molded for the ends of the spike may contain simply acrylamide and a suitable polymerization catalyst with no inorganic plant nutrients added.

For those fertilizer composites made by my method that are hydroscopic, the absorption of atmospheric moisture may cause softening of the finished product. This softening may be inhibited if not prevented by coating the dried composite with a waterproof coating. Coating the composite to prevent absorption of atmospheric moisture may be accomplished by dipping the dried composite in a solution of a water-insoluble polymer in a suitable organic liquid, such as a solution of poly-methyl-methacrylate or polyphenylene oxide in chloroform, and then allowing the solvent to evaporate.

What is claimed is:

1. A method of forming a rigid, unitary mass plant and soil conditioner composite for use in treating plants and trees comprising the steps of forming an aqueous paste of plant and soil conditioners, acrylamide, a catalyst, and between about 5 and 40 volume percent water, said acrylamide being present in an amount sufficient to provide at least 5 percent by weight of polyacrylamide in the final product, forming said aqueous paste to a desired shape, polymerizing said acrylamide to form polyacrylamide, and drying said molded content to remove substantially all of said water.

2. A method according to claim 1, wherein said aqueous paste is formed into the shape of a spike.

3. The method of claim 1, whereby the aqueous paste to be formed is made by mixing a concentrated aqueous solution of said acrylamide and containing said catalyst for the polymerization of the acrylamide with dry powdered plant nutrients.

4. The method of claim 1, whereby the formed aqueous paste is heated to a temperature between ambient and 100° C. to shorten the time for polymerization of the acrylamide in the mixture.

5. The method of claim 1, whereby drying of the formed composite is done at a temperature between ambient and 150°C.

6. The method of claim 1, whereby the plant and soil conditioners used to make the paste to be molded are in the form of a fine powder having a particle size which permits the dry powdered plant and soil conditioners to pass through a 60-mesh sieve.

7. The method of claim 1, whereby the quantity of acrylamide present in the aqueous slurry to be formed is such as to provide in the range of 10 percent to 30 percent by weight of polyacrylamide in the final composite product.

8. The method of claim 1, whereby the catalyst used for the polymerization of the acrylamide in the aqueous paste to be formed is also a plant and soil conditioner.

9. The method of claim 1, whereby the aqueous paste to be molded contains at least one water-soluble organic monomers other than acrylamide selected from the group consisting of acrylic acid, acrylonitrile and water-soluble esters of acrylic acid, and whose molecular structure has at least one carbon-to-carbon double bond, said organic monomers being capable of addition polymerization in the aqueous paste.

10. The method of claim 9, whereby the water-soluble organic monomer other than acrylamide is acrylic acid.

11. A plant and soil conditioner produced by the method set forth in claim 1.

* * * * *